June 1, 1943.    H. E. BRELSFORD    2,320,563
LIQUID LEVEL GAUGE
Filed Feb. 5, 1940

INVENTOR.
Harry E. Brelsford
BY
ATTORNEY.

Patented June 1, 1943

2,320,563

UNITED STATES PATENT OFFICE 2,320,563

LIQUID LEVEL GAUGE

Harry E. Brelsford, Birmingham, Mich., assignor to Diamond Power Specialty Corporation, Detroit, Mich., a corporation of Michigan Application February 5, 1940, Serial No. 317,301

1 Claim. (Cl. 73—330)

My invention relates to liquid level gauges and has particular reference to gauges for high pressure steam boilers.

It is a primary object of my invention to provide an improved gauge in which the total steam pressure load on the gauge glass is greatly decreased as compared to the load on the glass in the conventional gauge, and to decrease the heat absorption area with respect to the total volume of glass, thus minimizing glass failures. It is a feature of the invention that these objects are attained without decreasing the visibility through the gauge.

Another object of my invention is to reduce the gasket area adjacent the steam and boiler water in a gauge glass while retaining the "loose window" principle of construction, whereby the size of the mica sheets and gaskets which require relatively frequent replacement are also reduced and maintenance costs lowered.

A further object of my invention is to provide a device of the character described in which distortion of the cover plate by non-uniform tightening of the cover plate bolts does not impose undue strains on the glass as contrasted to the ordinary construction wherein distortion of the cover plate is detrimental and increases glass failures.

A still further object of my invention is to provide a liquid level gauge in which any movement of the gauge glass due to the boiler pressure on the face thereof gives it increased freedom from surrounding metal parts, thus eliminating or decreasing the possibility of the glass being crowded by strains and distortion of the metal due to temperature variation.

Additionally my invention makes possible the use of a much smaller space for the media to be measured without sacrificing the full visibility obtained in gauges having larger internal recesses.

With the aforesaid objects in view, my invention consists in the novel combination and arrangement of parts hereinafter described in their preferred embodiments, pointed out in the subjoined claim, and illustrated in the annexed drawing, wherein like parts are designated by the same reference characters in all views, and wherein:

Figure 1:
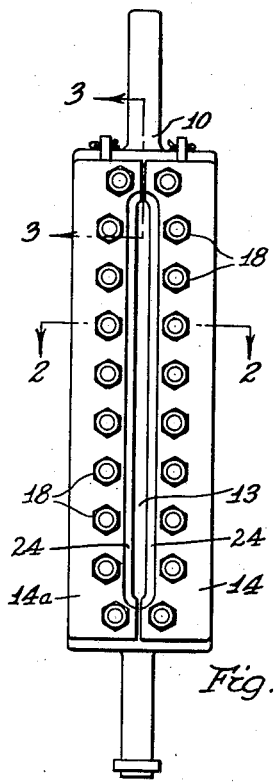
Fig. 1 is a front elevation of my improved gauge.
Figure 2:
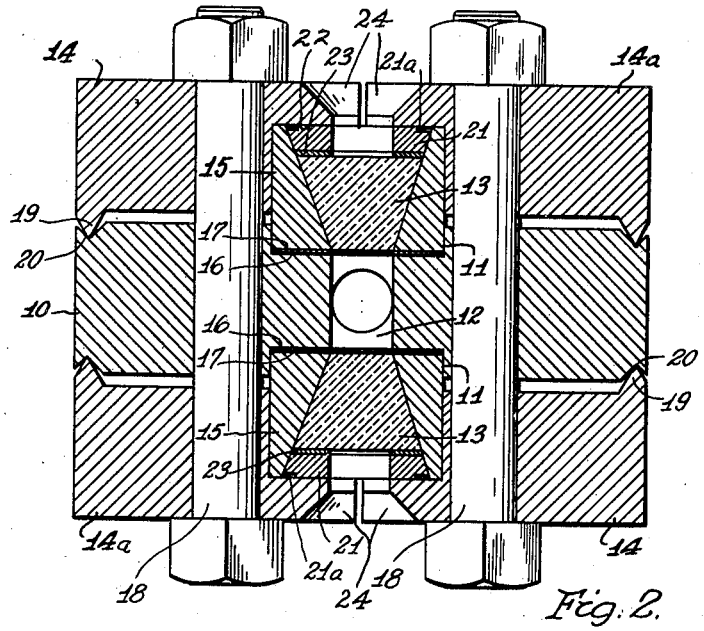
Fig. 2 is an enlarged horizontal section taken on the line 2—2 of Fig. 1.
Figure 4:
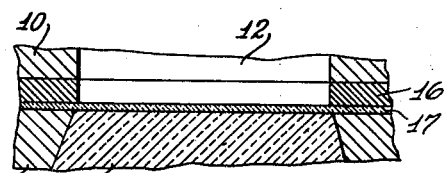
Fig. 4 is an enlarged fragmentary section showing the relation of the gauge glass and surrounding parts to the internal recess.
Figure 3:
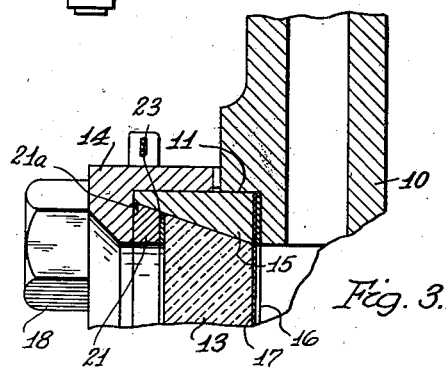
Fig. 3 is a fragmentary section taken on the line 3—3 of Fig. 1.

Referring first to Fig. 2 the reference character 10 denotes a gauge body member having aligned gasket recesses 11 on opposite faces thereof and a central water or steam space 12 connecting the recesses. The gauge body member thus has a substantial shoulder portion laterally of the respective recesses. Disposed on opposite sides of the water space 12 in the recesses 11 are sight glasses 13 so that vision is straight through the gauge to disclose the water level. The cover plate assembly departs from the conventional arrangement in that each plate consists of two halves or retainers 14 and 14a spaced from and independent of each other in their action on the right and left hand sides of the gauge respectively as viewed in the drawing. Each member 14 has a cut out portion along its inner edge which forms a sight slot or vision opening 24. This slot may be described as U-shaped with the branches of the U being substantially fore shortened, the ends of the branches of the U of the member 14 terminating adjacent the branches of the member 14a thus forming an oval shaped opening between these members when assembled.

Inasmuch as the assembly is identical on both sides of the gauge body member, it will be understood that any structure described is the same on both sides of the center plate.

The glasses 13 as illustrated in Figure 2 are of modified wedge or isosceles trapezoidal shape in transverse cross-section and are disposed with their small bases adjacent the water space 12. The upper and lower ends are rounded to conform to the oval shaped openings. Continuous one-piece members 15 encircle each inclined face of each glass 13, these members each being substantially trapezoidal in transverse cross-section and filling the spaces between the sidewalls of the recesses 11 and the glasses 13 thus providing inclined sidewalls converging in the direction of the pressure chamber 12 as lateral retaining means for the glasses 13. These members 15 extend substantially outwardly beyond the large base of their adjacent glass in order to take the greater part of the pressure from the glass retaining cover plate halves 14 and 14a. Gaskets 16 are inserted between each recess shoulder portion and its member 15. A sheet of mica or other transparent material 17 overlies the entire small base of each glass with its ends extending between the gaskets 16 and the members 15.

Bolts 18 extend through the cover plate members 14, 14, 14a and 14a and through the gauge body member 10 to maintain all parts in assembly. An adapter piece 21 arranged between the glass 13 and the shoulder 22 of the retainer member 14 is provided in order to increase the area of glass over which pressure is exerted. The adapter pieces 21 are relieved at their outer faces by the notches 21a. A gasket 23 seals this joint. The adjacent surfaces of the members 10 and 14, 14a are spaced from each other with the result that the pressure exerted by the bolts 18 is distributed between the V and groove engagements and the pressure members 15. By reference to Fig. 2 this V and groove engagement will be observed to be a substantially V shaped ridge 19 projecting from the members 14, 14a adjacent their outer edges and designed to seat in corresponding grooves 20 in the member 10. The depth of the groove is considerably less than the height of the ridge so that the facing surfaces are held apart and the walls of the groove are of greater angularity than those of the ridge. This arrangement permits pivotal movement of the cover plate halves 14, 14a with respect to the gauge body member 10 restricted only by the member 15 and the bolts 18. Because of this ability of the plates 14, 14a to move relative to the member 10 distortion of the plates 14, 14a is avoided and strains more evenly distributed.

Figure 5:
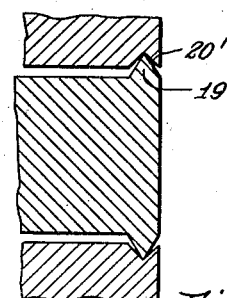
Fig. 5 is a fragment showing an optional method of spacing the retainer and gauge body member.

The V and groove engagement may optionally be as shown in Figure 5 with the projection 19' on the center plate and the groove 20' in the members 14.

With the structure as above described I have thus reduced the mechanical load on the glass and the heat absorbing area thereof and thermal stresses therein caused by changes of temperature in the media in the space 12. The face of the glass is approximately the same width as the space 12 and the load that the glass must assume from the steam pressure is accordingly decreased in proportion to this reduction of area as compared to conventional gauges of this type, as illustrated for instance in the patent to Kerr 1,703,426. Having thus greatly decreased the load on the glass from that of the conventional plan, the area on the large base of the glass required to withstand this load is reduced accordingly.

It has been found that when the bolts are drawn tight on a gauge having one-piece cover plates, the plates are distorted so that the glass does not seat properly. Because of this, the loading is localized on the edge of the glass or elsewhere which is conducive to glass failure. In my design when the bolts 18 are pulled down hard the support 14, 14a for the adapter piece 21 tends to assume a convex shape so that the loading on the glass is exerted toward the center of the glass instead of toward the edges. It is an advantage of my construction that having reduced the load on the glass, the bolts 18 are not required to carry as heavy a load as in conventional constructions, therefore, smaller bolts 18 can be used, and the bolts located closer to the pressure member 15 than would be otherwise possible.

Figure 6:
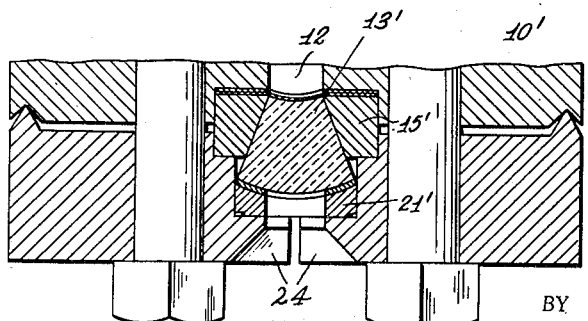
Fig. 6 is a fragmentary horizontal section of another embodiment of my invention.

Fig. 6 discloses a modification of my invention wherein the outer surface of the glass 13' is convex and the inner surface concave, the object being to make possible a glass even smaller in its surface exposed to the media in the space 12 and yet to have a full image to view from the exterior of the gauge. This shape for the glass 13' so magnifies the image of the media that it will appear to be the full width of the slot in the cover plates rather than the width actually existing in the center plate 10'.

The pressure member 15' and adapter piece 21' perform the same function as the pressure member 15 and adapter piece 21 respectively in the first described form of the invention but are necessarily of a different shape due to the difference in shape of the glass 13'.

While the invention has been shown and described as applied to a gauge having two sight glasses and vision through the gauge it will be understood that the advantages will be the same if utilized on a gauge having only a single sight glass.

It is to be understood that the description is for the purposes of illustration only and is not definitive of the limits of the inventive idea. The right is, therefore, reserved to make such changes in the details of construction and arrangement of parts as will fall within the purview of the attached claim.

What is claimed is:

A gauge comprising a solid gauge glass body member having a longitudinal opening therethrough adapted for connection at each end to a boiler and having recesses on opposite sides thereof each adapted to receive a gauge glass, each glass being of trapezoidal cross-section with its small base exposed to the interior of said body member, a two-part retaining means for each of said glasses having fulcrum means near its perimeter coactive with a fulcrum mating means on said body member, said retaining means each being bolted to said body member and having a sidewall substantially coplanar with a sidewall of one of said recesses and having a shoulder portion overhanging said glass, a solid pressure member trapezoidal in cross-section between each of said shoulder portions and the bottoms of the underlying recesses, and a metallic secondary pressure member between the outer end of each of said shoulders and said gauge glasses.

HARRY E. BRELSFORD.